US011363338B2

(12) United States Patent
Printz et al.

(10) Patent No.: US 11,363,338 B2
(45) Date of Patent: *Jun. 14, 2022

(54) NATURAL LANGUAGE NAVIGATION RELATIVE TO EVENTS IN CONTENT OF AN AUDIO VIDEO STREAM

(71) Applicant: Promptu Systems Corporation, Menlo Park, CA (US)

(72) Inventors: Harry William Printz, San Francisco, CA (US); Jason Simpson, Redwood City, CA (US)

(73) Assignee: Promptu Systems Corporation, Menlo Park, CA (US)

(*) Notice: Subject to any disclaimer, the term of this patent is extended or adjusted under 35 U.S.C. 154(b) by 49 days.

This patent is subject to a terminal disclaimer.

(21) Appl. No.: 16/835,047

(22) Filed: Mar. 30, 2020

(65) Prior Publication Data

US 2020/0228868 A1 Jul. 16, 2020

Related U.S. Application Data

(63) Continuation of application No. 15/222,924, filed on Jul. 28, 2016, now Pat. No. 10,609,454.

(Continued)

(51) Int. Cl.
*H04N 21/472* (2011.01)
*G06F 16/41* (2019.01)
(Continued)

(52) U.S. Cl.
CPC ........... *H04N 21/472* (2013.01); *G06F 16/41* (2019.01); *G06F 16/44* (2019.01); *G10L 15/18* (2013.01);
(Continued)

(58) Field of Classification Search
CPC ............ H04N 21/472; H04N 21/47217; G06F 16/41; G06F 16/44; G11B 27/30;
(Continued)

(56) References Cited

U.S. PATENT DOCUMENTS 5,765,164 A 6/1998 Prasad et al.
5,835,667 A 11/1998 Wactlar et al.
(Continued)

FOREIGN PATENT DOCUMENTS

JP 2001283077 A 10/2001
JP 2003204536 A 7/2003
(Continued)

OTHER PUBLICATIONS

European Patent Office, Office Action, Examination dated Feb. 10, 2021 for Application No. 16833617.0, 11 pages.
(Continued)

*Primary Examiner* — Anthony Bantamoi
(74) *Attorney, Agent, or Firm* — Perkins Coie LLP

(57) ABSTRACT

The disclosed embodiments include a computer implemented method to control the presentation of an audio video stream. The method includes obtaining an audio video stream and associating the audio video stream with events. The events include an interpretation of content of the audio video stream. The method further includes obtaining a natural language command, generating a control signal based on the natural language command by referencing a particular event, and using the control signal to control presentation of the audio video stream relative to the particular event.

44 Claims, 11 Drawing Sheets

Related U.S. Application Data

(60) Provisional application No. 62/199,933, filed on Jul. 31, 2015.

(51) Int. Cl.
*G06F 16/44* (2019.01)
*G11B 27/30* (2006.01)
*G11B 27/28* (2006.01)
*G11B 27/34* (2006.01)
*G10L 15/18* (2013.01)
*G10L 15/22* (2006.01)

(52) U.S. Cl.
CPC .............. *G10L 15/22* (2013.01); *G11B 27/28* (2013.01); *G11B 27/30* (2013.01); *G11B 27/34* (2013.01); *H04N 21/47217* (2013.01); *G10L 2015/223* (2013.01)

(58) Field of Classification Search
CPC ....... G11B 27/28; G11B 27/34; G11B 27/022; G11B 27/028; G10L 15/18; G10L 15/22; G10L 2015/223
See application file for complete search history.

(56) References Cited

U.S. PATENT DOCUMENTS

| | | |
|---|---|---|
| 8,972,262 B1 | 3/2015 | Buryak |
| 2003/0070182 A1 | 4/2003 | Pierre et al. |
| 2003/0078766 A1 | 4/2003 | Appelt et al. |
| 2008/0062127 A1 | 3/2008 | Brodersen et al. |
| 2008/0120665 A1 | 5/2008 | Relyea et al. |
| 2009/0222442 A1 | 9/2009 | Houh et al. |
| 2009/0238403 A1 | 9/2009 | Rhoads et al. |
| 2010/0005485 A1 | 1/2010 | Tian et al. |
| 2013/0152139 A1 | 6/2013 | Davis et al. |
| 2014/0349750 A1* | 11/2014 | Thompson ............... A63F 13/30 |
| 2015/0110462 A1 | 4/2015 | Eyler et al. |
| 2015/0163538 A1* | 6/2015 | Wheatley ........... H04N 21/6587 |
| 2015/0163558 A1 | 6/2015 | Wheatley |
| 2015/0382047 A1 | 12/2015 | Van Os et al. |
| 2017/0070783 A1 | 3/2017 | Printz et al. |

FOREIGN PATENT DOCUMENTS

| | | |
|---|---|---|
| JP | 2003532164 A | 10/2003 |
| JP | 2004519923 A | 7/2004 |
| JP | 2005033619 A | 2/2005 |

OTHER PUBLICATIONS

Tjondronegoro, "Content-based Video Indexing for Sports Applications using Integrated Multi-Modal Approach", Deakin University, May 1, 2005.

Ito, N., "R & D Front: Interactive Intelligence Understanding Technology to Find Immediately the Program You Want to Watch by Voice Operation", Toshiba Review, vol. 70, No. 2, Toshiba Corporation, Feb. 1, 2015, 56th—p. 57, ISSN: 0372-0462.

Tjondronegoro, D> W., "Content-based Video Indexing for Sports Applications using Integrated Multi-Modal Approach," Deakin University, May 2005; http://dro.deakin.edu.au/eserv/DU:30023258/tjondronegoro-conentbased-2005.pdf; retrieved Nov. 2, 2018; 320 pages.

Yamada, et al., "Automatic Generation of Soccer Program Metadata Using Announced Comments" IEICE Technical Report, vol. 104, No. 668, The Institute of Electronics, Information and Communication Engineers, Feb. 18, 2005, pp. 37-42, ISSN: 0913-5685.

\* cited by examiner

NATURAL LANGUAGE NAVIGATION RELATIVE TO EVENTS IN CONTENT OF AN AUDIO VIDEO STREAM

CROSS-REFERENCE TO RELATED APPLICATIONS

This application is a continuation of U.S. patent application Ser. No. 15/222,924, filed Jul. 28, 2016, which claims priority to U.S. Provisional Patent Application Ser. No. 62/199,933, filed Jul. 31, 2015. The aforementioned applications are incorporated herein by reference in their entirety.

BACKGROUND OF THE INVENTION

Various of the disclosed embodiments concern natural language navigation and assisted viewing of indexed audio video streams, notably sports contests.

BRIEF SUMMARY OF THE INVENTION

Embodiments of the invention combine various methods for video indexing of an AV stream, and various methods for constructing natural language user interfaces, to enable the use of spoken or written commands to navigate within or otherwise enhance the viewing of the subject AV stream.

In one embodiment, the invention processes spoken commands by first using an automatic speech recognition (ASR) system to transcribe the user's speech into text, next presenting the transcribed text to a natural language understanding (NLU) system to determine its meaning, and finally acting upon the extracted meaning to control playback of or otherwise enhance the viewing of the associated AV stream, which has previously been or is presently being subjected to a video indexing step. For example, the user of the invention could issue commands like "skip to the second quarter" or "show me the last play again in slow motion" while watching a football game, "go to the 10 minute mark" while viewing a basketball game, or "show me just the holes that Phil Mickelson played" while viewing a golf tournament.

DETAILED DESCRIPTION

Figure 1:
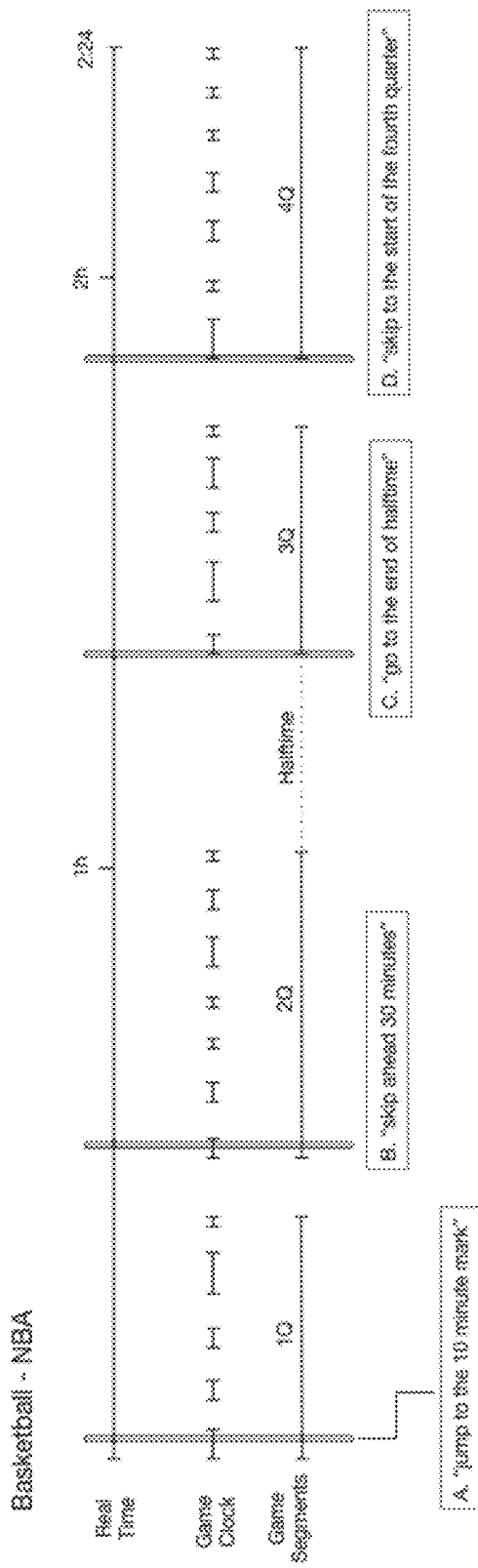
FIG. 1 is a diagram illustrating the relationship among real time, game clock time, and game segments.

Various example embodiments will now be described. The following description provides certain specific details for a thorough understanding and enabling description of these examples. One skilled in the relevant technology will understand, however, that some of the disclosed embodiments may be practiced without many of these details.

Likewise, one skilled in the relevant technology will also understand that some of the embodiments may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this Detailed Description section.

Natural Language Navigation and Assisted Viewing of Indexed Audio Video Streams, Notably Sports Contests Embodiments of the invention combine various methods for video indexing of an audio video stream (equivalently "AV stream" or "stream" for short), and various methods for constructing natural language user interfaces, to enable the use of spoken or written commands to navigate within or otherwise enhance the viewing of the subject AV stream.

In one embodiment, the invention processes spoken commands by first using an automatic speech recognition (ASR) system to transcribe the user's speech into text, next presenting the transcribed text to a natural language understanding (NLU) system to determine its meaning, and finally acting upon the extracted meaning to control playback of or otherwise enhance the viewing of the associated AV stream, which has previously been or is presently being subjected to a video indexing step. For example, the user of the invention could issue commands like "skip to the second quarter" or "show me the last play again in slow motion" while watching a football game, "go to the 10 minute mark" while viewing a basketball game, or "show me just the holes that Phil Mickelson played" while viewing a golf tournament.

Variations and refinements of this concept are explained below, all of which are part of the invention.

Key Concepts and Definitions

The words "user" and "viewer" will be employed interchangeably throughout this document.

By "audio video stream" is meant an electronic representation comprising synchronized sound and images, or potentially sound only or images only, suitable for display for live viewing, recording for subsequent playback, or both. Colloquially, such a stream is typically called a "video." We use the term "audio video stream" to emphasize that the associated electronic signal typically contains synchronized sound and images. However, we note that as defined here the stream may comprise sound only or images only.

In this document we will use the term "audio video stream" interchangeably to mean any of:

(a) the actual ongoing electronic signals that may be recorded or displayed by suitable devices or media, (b) the synchronized sound and images, emerging from a suitable device, that may be viewed by a user, or (c) the stored representation of the synchronized sound and images, from which the aforementioned electronic signals, and ultimately the synchronized sound and images, may be recreated.

In the event of the need to distinguish among these various senses, we will use "audio video signal stream" for sense (a), "audio video display stream" for sense (b), and "audio video stream stored representation" for sense (c).

By "audio video stream metadata" (or "AV stream metadata," "stream metadata," or "video metadata") is meant some usually non-AV-stream representation of, or information associated with, the subject AV stream. This typically comprises text or other data, possibly conforming to some agreed format or organization, that identifies thematic information about, entities appearing or otherwise treated within, or more generally information related to, the AV stream, of potential interest to the user. Examples include the type of the sports contest (e.g. a basketball game, a FIFA soccer game), the names and nicknames of the teams (e.g. "New York Giants," "Giants," "Denver Broncos," "Broncos"), or individuals associated with the event (e.g. the golfers competing in a particular tournament, the player rosters of the contesting teams, or the horses running in a race). However, other kinds of metadata, and other formats or media, are possible. For example, the metadata might also include still or moving images of particular individuals or objects (e.g. images of participants or coaches, or horses or race cars), or information about the content that is either known (e.g. the history and type of scoring events within a completed game) or anticipated (e.g. the text of a speech that a political figure will deliver).

In embodiments of the invention, AV stream metadata need not be presented in its complete and final form at the start of AV stream processing. Specifically, the AV stream metadata, in whole or in part, could be presented or generated contemporaneously with the ongoing input of the AV stream. An example would be the subtitles or "closed captioning" information that may be embedded in live over-the-air or cable television AV streams. This essentially textual information comprises part of and arrives contemporaneously with the AV stream, and may be usefully processed, for instance for adaptation of the invention's components, for assistance or augmentation of the video indexing process, for search for desired events or conditions, or for some other purpose. For the purposes of this document this information is considered to be AV stream metadata. Such subtitles may of course be present in a completed AV stream recording as well, as in a DVD, and may be available as a whole at the start of AV stream processing, or only contemporaneously as the AV stream is played back (i.e. reconstructed for viewing). All such varieties of AV stream metadata, and all orders or manners of presentation of same to the invention as a whole or to any of its components, modules or processes are comprehended by the invention.

By "an indexed audio video stream" is meant an AV stream that has been processed to produce a symbolic representation of the AV stream content, comprising the "index," which may be used as the basis for navigating within or otherwise enhancing the viewing of the associated stream. The index may be as simple as a mark or representation of the elapsed playback time within the video. Such a mark is typically inserted into the stream at the time that it is recorded; nevertheless we include it here as a simple but non-trivial example.

More generally an index, especially one generated from a sports contest AV stream, may include the start and/or extent of particular regulation segments or periods (the first quarter, second quarter, third quarter, fourth quarter, etc.), the notation of particular events (a goal by a particular team, the committing of a foul by or against a player, the insertion or withdrawal of a particular player, etc.), or other notable periods or events that may be of interest to a typical viewer. Alternatively, an index of a non-sports-contest AV stream may include the separation into individual episodes, segments, chapters or scenes, or other notable durations or events that may be of interest to a typical viewer. Additional examples appear in the sequel.

The methods and mechanisms applied to generate this index may themselves make use of ASR and NLU technologies, among others. However we will not further explore the internal structure of the index generation component or process, except insofar as noting that such technologies may in performing their function utilize and adapt to the aforementioned AV stream metadata, and hence that it may be of use to supply such metadata to this component or process.

By "navigating" is meant searching and/or controlling, in the sense of searching for and/or finding a particular time, event, action, or sequence of discontiguous but related actions, or other milestone, excerpt, period or sequence of discontiguous but related periods within the stream, and causing playback to resume at or possibly skip over the identified event or period(s); this includes controlling the speed of and/or direction at which playback proceeds. Controlling the speed of and/or direction at which playback proceeds may also include freezing the display at a selected point within the AV stream.

By "assisted viewing" is meant all of the actions and capabilities of "navigating" as defined immediately above, plus additional functions that may enhance the experience of viewing the AV stream, for instance the setting of alerts. The concept of "alerts" is defined and discussed further below.

By "natural language commands" are meant instructions or commands, in either spoken or textual form, as they might be given by one person to another in a conventional human language like English or French.

There are known techniques for processing natural language commands to extract a symbolic representation of their meaning, suitable for controlling an electronic device. For spoken commands, this typically involves a combination of automatic speech recognition (ASR), which converts an audio stream comprising human speech into the corresponding text, and natural language understanding (NLU), which processes prose text (such as the output of an ASR system) and generates a symbolic representation of its meaning. For textual commands, as there is no spoken input, the text entered by the user is typically presented to the NLU system for extraction of its meaning.

The design of the natural language interface of the invention is not limited to the architecture set forth above (that is, the sequential operation of ASR and NLU components, modules or technologies). A single-step architecture that simultaneously generates both transcription and meaning, for example by use of a tagged or otherwise semantically notated grammar, or conversely a multi-step architecture wherein information flows in both directions between the ASR and NLU components, also comprises a realization of this portion of the invention.

Likewise, there are known techniques for indexing AV streams. The index may be generated in real time (that is, from a live-action stream, as it is being delivered to a viewer or recording device) or post-action (that is, from a previously completed recording). The index itself may be a separate electronic recording or object, or may be added to and therefore embedded within the AV stream. The processing performed to generate the index may work by analysis of the stream images only, the stream sound only, or both; it may be performed completely automatically, completely by humans, or by some combination of the two.

References to Time

An important part of the invention is the treatment of natural language references to time. There are at least three ways in which a particular moment in a sports contest AV stream may be referenced in natural human language: real time, game clock time, and regulation periods or segments. Embodiments of the invention recognize and support all three kinds of reference, to the extent and in the manner that each may apply to a particular AV stream. We briefly discuss these three kinds of reference, and illustrate the relationship among them in FIG. 1

Real Time

This is the real elapsed time. References may be to a duration (for example, "skip ahead 10 minutes") or absolute (for example, "go to the 2 hour mark"). Absolute references are measured from a given milestone. The milestone may be the start of the AV stream, the regulation start of the event or contest (e.g., the tip-off of a basketball game, the report of the starter's pistol in a footrace, or the umpire's cry "Play ball!" in a baseball game), or some other canonical or agreed event.

Embodiments of the invention support references to real time, examples below.

Game Clock

Some sports (for example American football, basketball, hockey, soccer) recognize a game clock, which measures the passage of time in regulation play. In most such sports, for example basketball, the game clock measures the amount of time remaining in a given regulation period; thus the clock counts down to zero remaining time, at which point the period ends. However in professional soccer the game clock counts up to a nominal 45 minutes for each regulation half, plus up to 6 minutes of "stoppage time" added by the referee.

Embodiments of the invention support references to all varieties of game clock time, examples below.

The exact meaning of a natural language reference to game clock time will vary with the sport event in question (for example, professional soccer versus other sports, as discussed immediately above). This variability is recognized and supported by the invention.

Regulation Periods or Segments

Some sports are divided into regulation periods or segments. For example, American football and professional basketball games are divided into quarters, college basketball and soccer games are divided into halves, hockey is divided into periods, baseball is divided into innings, boxing is divided into rounds, and so on. In addition some sports contests recognize the notion of "halftime," which separates the second and third quarters (in sports divided into quarters) or the first and second halves (in sports divided into halves). Sports divided into quarters, or an even number of periods or segments, are also implicitly divided into halves.

Embodiments of the invention support references to regulation periods or segments, examples below.

As just noted, the very vocabulary of natural language references to regulation periods or segments will vary with the sports contest in question. This variability is recognized and supported by the invention.

DISCUSSION

FIG. 1 exhibits the relationship among these three kinds of references to time. FIG. 1 illustrates references to time in an AV stream comprising a National Basketball Association (NBA) game. The milestone used for references to real time is the start of the first of the four 12-minute quarters.

FIG. 1 is provided for the indicated illustrative purposes only. It should be noted that the entire AV stream associated to an actual contest typically begins before the official start of regulation play and typically extends beyond the official end of same. More generally, an AV stream as construed within this document includes the periods before and after the official or nominal start of any contest, event, or activity that is the subject of the AV stream. The invention comprehends these additional periods and includes operations, actions and functions performed within and with reference to them.

The three horizontal lines, denoted "Real Time," "Game Clock" and "Game Segments," illustrate the three previously-discussed ways in which natural language expressions identify a moment within the associated AV stream.

The "Real Time" line exhibits the passage of real world time. In this particular example the elapsed time of the game is 2 hours and 24 minutes. The notations "1 h" and "2 h" on the "Real Time" line respectively indicate the points at which 1 hour of real time and 2 hours of real time have elapsed, as measured from the official start of the game. The notation "2:24" on the "Real Time" line indicates the point at which 2 hours and 24 minutes of real time have elapsed, as measured from the official start of the game. As noted above, FIG. 1 adopts regulation start of play as the milestone for measurement of real time duration, which is then used to interpret commands that are understood as absolute references to real time. Another possible milestone is the start of the AV stream; this possibility is also comprehended by the invention.

The "Game Clock" line, which unlike the Real Time line shows interruptions, exhibits the passage of regulation play time. There are four groupings, representing the 12-minute duration of each of four quarters. The game clock in basketball, and in most sports (with the exception of soccer), counts down from a set duration to the zero second mark.

The interruptions in the line represent the stoppage of the game clock, for instance for timeouts, fouls, etc. In reality the game clock for an NBA game would stop much more frequently. The line in the diagram is intended solely to illustrate the relationship between real time and game clock time, and does not accurately reflect the distribution between game clock running and game clock stopped that would occur in actual NBA play.

Because of these interruptions, while the total game clock time of each quarter is 12 minutes, the real time duration of each quarter is variable.

The "Game Segments" line shows the grouping of each quarter of the basketball game, indicating where each quarter starts and ends. The notations "1Q," "2Q," "3Q" and "4Q" respectively denote the first, second, third and fourth quarters. The period of time between the second and third quarters, commonly known as "Halftime," is also shown.

FIG. 1 also illustrates the meaning assigned by one version of the invention to four example commands.

Command A, "jump to the 10 minute mark," is interpreted as a reference to game clock time, within the currently viewed quarter. Playback is adjusted to resume at the point in the AV stream at which 10 minutes remain on the game clock, in the current quarter. The example in FIG. 1 presumes that the command is spoken while the user is viewing the first quarter of the game.

Command B, "skip ahead 30 minutes," is interpreted as a reference to a duration of real time. Playback is adjusted to resume at the point in the AV stream corresponding to the passage of 30 minutes of real time, measured from the point in the AV stream at which the user spoke the indicated command.

Command C, "go to the end of halftime," is interpreted as a reference to a game segment. Playback is adjusted to resume at the point in the AV stream corresponding to the end of the halftime period.

Command D, "skip to the start of the fourth quarter," is interpreted as a reference to a game segment. Playback is adjusted to resume in the AV stream corresponding to the start of the indicated period of regulation play.

Some of these commands are ambiguous with respect to their meaning. That is, other interpretations are possible, notably to Command A, "jump to the 10 minute mark." This could also be interpreted as any of:

(a) a reference to game clock time, corresponding to the point in the AV stream at which 10 minutes remain on the game clock in the next quarter (rather than the one currently being viewed; this assumes the user is not currently viewing the final quarter), (b) a reference to game clock time, corresponding to the point in the AV stream at which 10 minutes remain on the game clock in the final quarter, or (c) a reference to real time, corresponding to the point in the AV stream at which 10 minutes of real time have elapsed since the start of the game.

Figure 4:
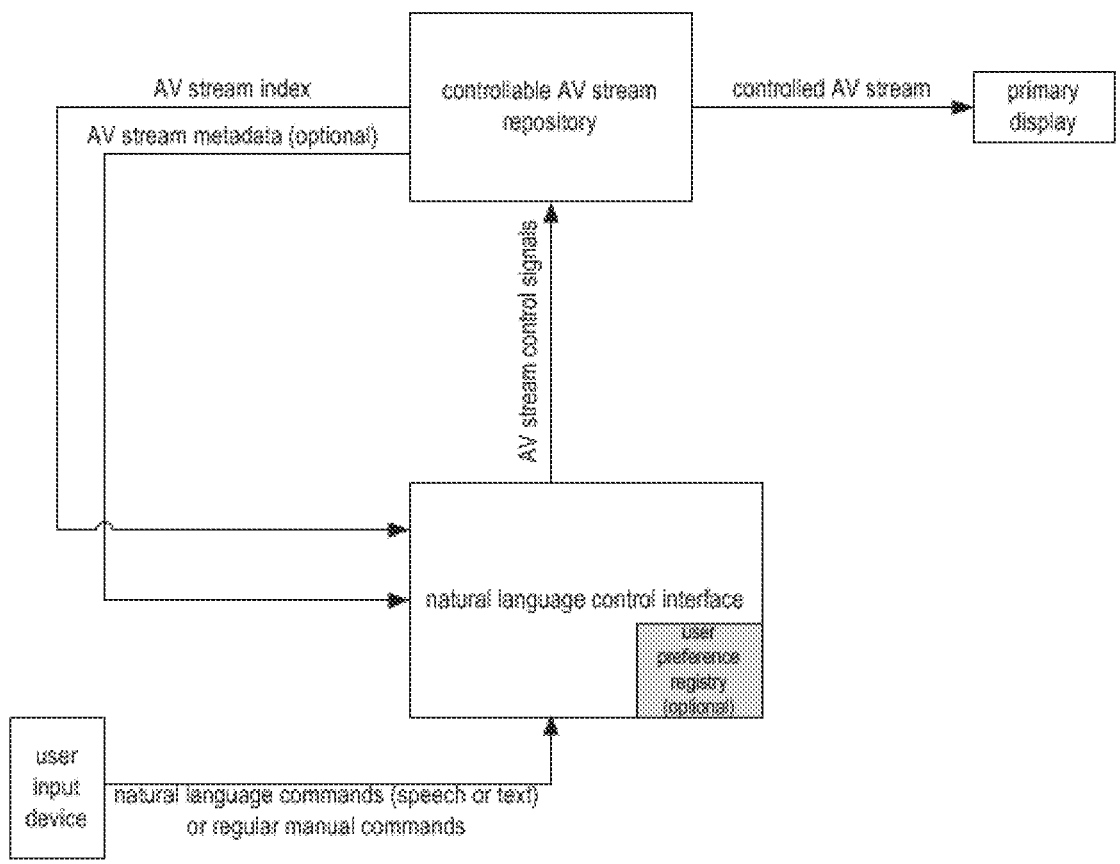
FIG. 4 is a diagram illustrating the complete AV stream operating mode, viewing phase, with optional user preference registry.

In practice, embodiments of the invention could present all four interpretations (the one shown in FIG. 1, and the three other possibilities just recounted) to the user to choose among. Or embodiments of the invention could optionally observe and record such preferences for an individual user or household in a suitable optional user preference registry, and abide by this preference in interpreting future commands. The aforementioned optional user preference registry is illustrated in FIG. 4; a similar optional user preference registry may be present in other embodiments of the invention, but is not illustrated in other Figures.

All such alternatives are comprehended by the invention.

Indexed Events

In this section we give examples of events that may be identified by an AV stream indexing component or process, and hence marked, annotated or indexed (we will use these terms interchangeably) within the AV stream index. We will refer to such events as "indexed events." These events, and other associated events or periods that may be deduced from them, may then become the basis for responding to various natural language commands.

An example of an associated event that may be deduced from a given indexed event is provided by the just-discussed case of an NBA basketball game: if the AV stream indexing component identifies the moment when regulation play of the game resumes with some specified time remaining on the game clock, let us say for concreteness 4 minutes and 30 seconds, then after the passage of 1 second of real time in the AV stream without suspension of play the game clock may be assumed to read 4 minutes and 29 seconds, and one second after that, 4 minutes and 28 seconds, and so on until the AV stream indexing component identifies suspension of play, or otherwise determines a new nominal value of the game clock. Each such deduced value of the game clock, at any given granularity, and its association with a particular moment within the AV stream, comprises a deduced event. A deduced event has the same status, for the purposes of responding to natural language commands, as an indexed event.

We explicitly make no assumption about what component or module of the invention makes such deductions, other than to observe that they could be made within an AV stream indexing component, a natural language control interface, a controllable AV stream repository, or some other component or module. Such deductions may take place during the indexing process, or at some later stage, notably when the meaning is extracted and the command is executed.

A list of potential indexed events (including deduced events) now follows. This list is illustrative only and not exhaustive or limiting. Not all listed events will be appropriate to, or identifiable within, any given AV stream.

1. start or end of AV stream
2. start or end of sports contest
3. milestone for references to absolute elapsed real time (if different from the above)
4. elapsed real time in seconds (before or after a particular milestone)
5. suspension or resumption of regulation play or activity (optionally with associated game clock time value)
6. elapsed or remaining game clock time in seconds
7. start or end of a regulation period
8. change of team roles (e.g. "at bat" vs. "fielding" in baseball, offense vs. defense in football and baseball); equivalently change of possession in certain sports
9. removal or insertion (i.e. substitution) of players (optionally of a particular named player)
10. scoring event (and type thereof, e.g. field goal vs. goal in American football)
11. on-goal shot attempt (soccer and hockey)
12. start or end of a play (e.g. from the snap of the ball to the end of action in American football, or from the throw of a pitch to the end of runner motion in baseball)
13. achieving of non-scoring regulation event (e.g. first down in American football)
14. start or end of timeout
15. start or end of commercial break
16. foul or rule violation committed (optionally by or against a particular named player)
17. assessment of penalty (e.g. free throws in basketball or corner kicks in soccer, optionally by or against a particular named player)
18. awarding of trophy or prize
19. start or end of play for a particular player (e.g. a hole played by a particular named golfer)
20. start or end of discussion of a particular topic (as in a political speech, news or information program or talk show)
21. entry or exit of a real person or fictional character (as in a biographical or fictional narrative)
22. start or end of an action or otherwise thematically related sequence (as in a biographical or fictional narrative)
23. start or end of a fight, dispute or altercation (optionally by or involving one or more particular named participants or teams, or participants identified by roles, e.g. coach, referee, umpire, etc., optionally identified by team names)
24. start or end of an episode, chapter or scene (optionally involving one or more named real persons, fictional characters, places, devices, actions or other identifying or selecting information)

The discussion above refers to events, in principle corresponding to particular moments in time within the AV stream. From such events whole time periods of interest, of non-zero duration (and possibly comprised of shorter periods, discontiguous in time) may be deduced. However it is possible that the AV stream indexing component may be capable of directly identifying and annotating whole time periods of interest. This alternative or additional indexing capability is comprehended by the invention.

Natural Language Commands

Below are examples of commands that may be accepted by the natural language interface and executed in embodiments of the invention. These command lists are illustrative only and not meant to be exhaustive or limiting. There are many more ways that indexed events could be used for search and control of playback of an AV stream.

The reader's attention is especially drawn to the numerous possible alternative phrasings of each example command. It is of the essence of a natural language interface that the user is not required to express himself or herself in the exact words or phrasings exhibited below. Alternative language with the same meaning will also be accepted by the natural language interface and correctly processed by the invention, and such alternatives (which are myriad) are included within its scope.

Thus, if the listed command is "skip ahead 10 minutes" then any alternate word sequence, understandable as equivalent in meaning by a competent speaker of English, for example "go forward 10 minutes," "jump ahead 10 minutes," "move 10 minutes forward," is likewise supported by the invention, and included within the scope of this disclosure. Variations in the details of listed commands, for instance a duration of 9 or 12 minutes rather than 10, a time milestone of 3 minutes or 60 seconds of game clock time rather than 2 minutes, or alteration of the name of a team or player, the type of scoring event, the nomenclature of a regulation period, and so on, are likewise within the scope of the invention Alternative language includes but is not limited to nicknames, contractions, slang words and other variants of names, roles and actions, e.g. "Steph Curry," "Curry" or "Steph" for "Stephen Curry"; "The Splash Brothers" for "Stephen Curry and Klay Thompson"; "ref" for "referee"; "homer" for "home run"; and so on. All such alternatives are likewise within the scope of the invention.

Real Time

These commands reference real time within the AV stream, as previously defined. Most of the commands listed here are references to relative rather than absolute real tim. That is to say, they move or request playback forward or backward, from the viewer's current position in the AV stream, by or for a given duration of real time. However, the use of relative formulations in reference to real time, though typical, is by no means a requirement, and some of the commands reference absolute real time, relative to an explicit or implicit milestone.

Example Phrases

Note: for clarity each example is marked as "relative" or "absolute"; these markings are not part of the example phrase.

1. "skip ahead 10 minutes" <relative>
2. "go 15 minutes forward" <relative>
3. "jump ahead 30 minutes" <relative>
4. "go back 10 minutes" <relative>
5. "play backward for 1 minute in slow motion" <relative>
6. "fast forward for 5 minutes" <relative>
7. "skip to one hour into the video" <absolute>
8. "show me the last minute of the race" <absolute>
9. "go to halfway through the video" <absolute>

Game Clock

These commands reference game clock time, and are pertinent to sports that use a game clock, such as American football, basketball, hockey, soccer, etc. Most of the commands listed here are references to absolute game clock time. That is to say, they move or request playback forward or backward, from the viewer's current position in the AV stream, to a particular numerical value of the game clock. However, the use of absolute formulations in reference to game clock time, though typical, is by no means a requirement, and some of the commands reference relative game clock time, measured from the viewer's current position in the AV stream.

Example Phrases

Note: for clarity each example is marked as "relative" or "absolute," and may include some parenthetical comments as well; these markings and comments are not part of the example phrase.

1. "go to the 10 minute mark" <absolute>(potentially also an absolute real time reference)
2. "watch the last 2 minutes of the game" <absolute> (potentially an absolute real time reference)
3. "move to 5 minutes on the clock" <absolute>
4. "show the preceding minute of regulation time in slow motion" <relative>
5. "skip forward two minutes of game clock time" <relative>

With regard to possible alternative interpretations of the nature of time references, see the earlier discussion of ambiguous commands, optionally presenting alternative interpretations to the user, and optionally recording user preferences for interpretation of future ambiguous commands.

Regulation Periods or Segments

These commands reference regulation periods or segments. The nomenclature used for a given period or segment varies with the sport: football and professional basketball use "quarters"; college basketball and soccer use "halves"; hockey uses "periods"; baseball uses "innings."

Example Commands for Quarter Segmentation

These commands reference regulation segments that are quarters; they are appropriate for example for American football and professional basketball. Sports with regulation segments that are quarters also typically have a halftime; some commands that reference halftime are listed here as well.

1. "jump to the second quarter"
2. "go to the start of the third quarter"
3. "skip this quarter"
4. "go to the next quarter"
5. "skip halftime"
6. "go to halftime"
7. "move to the end of halftime"
8. "go to the midway point of the fourth quarter" (open to interpretation as the midway point with respect to the real-time span of the fourth quarter, or as the midway point with respect to the game clock; again see the earlier discussion of ambiguous commands, etc.)

Example Commands for Half Segmentation

These commands reference regulation segments that are halves; they are appropriate for example for college basketball and soccer, and also implicitly for sports with regulation segments that are quarters.

1. "go to the second half"
2. "jump to midway through the first half" (likewise open to interpretation as the midway point with respect real time or game clock time; again see the earlier discussion of ambiguous commands, etc.)
3. "skip this half"
4. "watch the second half"
5. "skip halftime"

Example Commands for Period Segmentation

These commands reference regulation segments that are periods; they are appropriate for example for hockey.
1. "go to the second period"
2. "jump ahead to the third period"
3. "watch the third period"
4. "skip past this period"

Example Commands for Inning Segmentation

These commands reference regulation segments that are innings; they are appropriate for example for baseball.
1. "go to the third inning"
2. "jump to the ninth inning"
3. "jump to the top of the next inning"
4. "go to the bottom of the sixth"
5. "skip this inning"
6. "watch the fifth inning"
7. "go to the seventh inning stretch"

Example Commands for Downs Segmentation

These commands reference regulation segments that are "downs"; they are appropriate for example for American football. Optionally references to downs may include team or player names.
1. "go to second down"
2. "skip this down"
3. "go to the fourth down"
4. "watch first down again"
5. "show me that last down"
6. "watch the last down in slow motion"
7. "go to the next first down"
8. "go to the next 49ers first down"
9. "go to Kaepernick's next first down"

Possession

Some sports (e.g. American football) have long enough "possessions" that it is reasonable to reference the start or end of possession in a command. "Possession" may be defined as a period when a given team is on the offense (equivalently, is in control of the ball). Optionally references to possessions may include team or player names.

Example Commands
1. "go to the next Patriots possession"
2. "jump to the next change of possession"
3. "go to the next turnover" (this is the same as a change in possession)
4. "next Tide possession" (this is a reference to the "Crimson Tide," a nickname for University of Alabama sports teams)
5. "fast forward until the Broncos have the ball"

Plays

For sports that have a clear definition of plays (e.g. American football), the natural language interface may recognize and respond to references to these plays. Optionally, references to plays may include play types, team names or player names, playback speed, playback direction or any combination thereof.

Example Commands
1. "go to the next play"
2. "go back to the start of the last play"
3. "watch that play again"
4. "watch that play again in slow-mo"
5. "go back two plays"
6. "show me the next Seahawks play"
7. "go to Brandon Crawford's double play"
8. "show me the triple play"

Other Events

There are other events in a sports contest that could be used for control of video playback. These events include scoring, timeouts, change of pitcher in baseball, set plays and free kicks in soccer.

Example Commands
1. "skip over the timeout"
2. "jump past this pitcher change"
3. "go to the next touchdown"
4. "go back to the Seahawks last score"
5. "show the Arsenal goal"
6. "go to the next corner kick"
7. "watch the last Barcelona free kick"

Excerpts

The commands discussed so far reference point events. Embodiments of the invention also process commands that reference non-point events; that is, portions of the AV stream, extended in time, during which certain conditions apply. We refer to such non-point events as "excerpts." This term may also include temporally discontiguous (but thematically unified) sequences of non-point-events. Optionally, references to excerpts may include activity types, team, person or fictional character names, playback speed, playback direction or any combination thereof.

Example Commands
1. "show me just the holes that Mickelson played"
2. "show me only the ice dancing" (appropriate for instance to Olympic coverage, in which a single long broadcast, possibly recorded overnight, comprises multiple sports contests)
3. "only the Serena Williams match" (appropriate for instance to early-stage Wimbledon coverage, which may cut between multiple simultaneous early matches)
4. "just the 49ers possessions"
5. "show me all the fumbles"
6. "show me all of Curry's three-pointers"
7. "show me the argument between the ref and the Warriors' coach"

Advertising

Although nominally the sports contest is the principal focus of the viewer's attention, it is not unknown that advertising (commercials) within the AV stream may also be of interest. The invention is capable of responding to commands related to advertising.

Example Commands
1. "show me the Liam Neeson commercial"
2. "go to the Morphie ad"
3. "skip to the ad with Kim Kardashian"
4. "show me the Budweiser commercial"

Viewing Modes

Certain commands may alter the viewing characteristics of the AV stream in its entirety. Certain commands may pertain only to the viewing characteristics of the AV stream. Certain commands may combine search for events and/or excerpts with instructions pertaining to the viewing characteristics of the AV stream.

Example Commands
1. "show me the game without commercials"
2. "skip over the commercials"
3. "fast forward over all the timeouts"
4. "show me only the commercials"
5. "show me that fumble in slow motion"
6. "freeze on Curry's last jump shot"
7. "run forward at half speed"

Alerts

Certain commands apply to setting alerts for the Live Action AV Stream Operating Mode With Pre-Action (Alert) Support, discussed further below. In this operating mode, the indexing of the subject AV stream proceeds contemporaneously with the receipt of the AV stream itself (or as nearly so as may be achieved, in view of the finite, non-zero latency of the indexing process). These commands may be issued by the user in advance of the associated events; they cause the ongoing indexing process to be monitored and alert the user if one or more of the associated events is detected. This concept is explained in greater detail below.

Example Commands to Register an Alert

These commands pertain to registering an alert.
1. "tell me when this commercial break ends"
2. "alert me when the game starts again"
3. "call me when LeBron gets back in the game"
4. "send me an alert when Michael Phelps is going to race"
5. "let me know when the leader board changes" (appropriate to golf tournaments)
6. "tell me if the Warriors catch up"
7. "text me if the Razorbacks get within a touchdown"
8. "alert me if the game gets tighter than 10 points"
9. "tell me if the game gets close" (the criterion for judging that a game is "close" will vary from sport to sport, and moreover may involve some viewer subjectivity; we envision that for this and similar alerts the invention may use a sport-dependent criterion, may allow the viewer to set a suitable possibly sport-dependent criterion, may track viewer behavior to deduce a suitable automatically personalized possibly sport-dependent criterion, or may employ some combination of the aforementioned techniques to determine a suitable criterion)
10. "let me know if the Broncos score"
11. "signal me when halftime ends"
12. "send a message when halftime starts"
13. "tell me when the fourth quarter begins"
14. "let me know when there are two minutes left on the game clock"
15. "send an alert if he starts talking about Social Security" (appropriate to political speeches, notably the State of the Union address)
16. "alert me if there's a question about immigration" (appropriate to political debates)
17. "text me when Final Jeopardy starts" (appropriate to the game show "Jeopardy")
18. "tell me if Taylor Swift performs"
19. "alert me if there's an Apple ad"

Example Commands to Respond to an Alert

These commands pertain to control when an alerted-for condition has been detected.
1. "go back to the alert"
2. "start playing from the alert"
3. "show me the action from the alert forward"
4. "go back to 30 seconds before the alert"
5. "start playback"

Other

Certain commands do not fall into any of the above categories. Some examples are listed here.

Example Commands
1. "go back to real time"
2. "return to regular viewing"
3. "show me live TV again"
4. "fast forward to live TV"

Operating Modes

Embodiments of the invention support various operating modes, which differ with respect to the status of the AV stream (complete or live action), when the indexing of the AV stream is performed (real-time or post-action), and the scope and nature of the supported commands (navigation of the entire AV stream, navigation of the AV stream up to the present, alerting for anticipated future events).

These operating modes are further described and illustrated here.

Complete AV Stream Operating Mode

In one operating mode, the AV stream in question exists in an already complete form. This is the "Complete AV Stream Operating Mode." In this operating mode the sports contest and possibly any associated post-contest commentary included in the AV stream has concluded, before the processing of any user commands. That is, the AV stream is complete and not ongoing. This is as opposed to live input of and contemporaneous or near-contemporaneous indexing and viewing of the subject AV stream, a possibility that is considered below.

In this operating mode, the invention may operate in two phases, an indexing phase and a viewing phase. The two phases of the invention may be architected and may operate as illustrated in FIG. 2 and FIG. 3, respectively.

Figure 2:
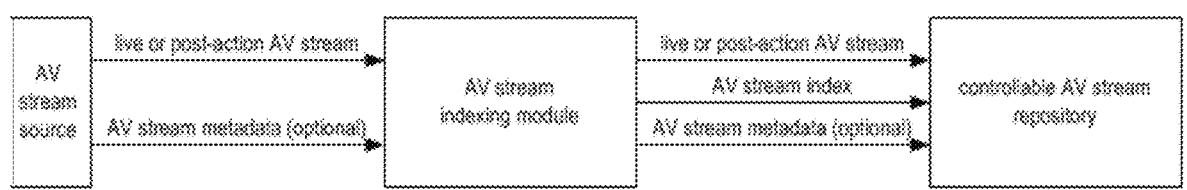
FIG. 2 is a diagram illustrating the complete AV stream operating mode, indexing phase.

In the indexing phase, illustrated in FIG. 2, the AV stream, and optionally associated AV stream metadata, may be presented to the AV stream indexing module. The AV stream indexing module generates an associated AV stream index, typically comprising symbolic representations of the aforementioned indexed events, along with suitable information to locate the indexed event within the AV stream. This AV stream index, along with the AV stream itself, and any optional AV stream metadata, is deposited in the controllable AV stream repository.

Typically, this processing step, the creation of the AV stream index, is performed "post-action," which is to say, after the AV stream is complete. Alternately, the AV stream index may be created live ("in real time"), as the AV stream arrives from its true original source. Both possibilities are comprehended by FIG. 2. In a third possibility, not illustrated here, the AV stream index is not created until the viewing phase.

Figure 3:
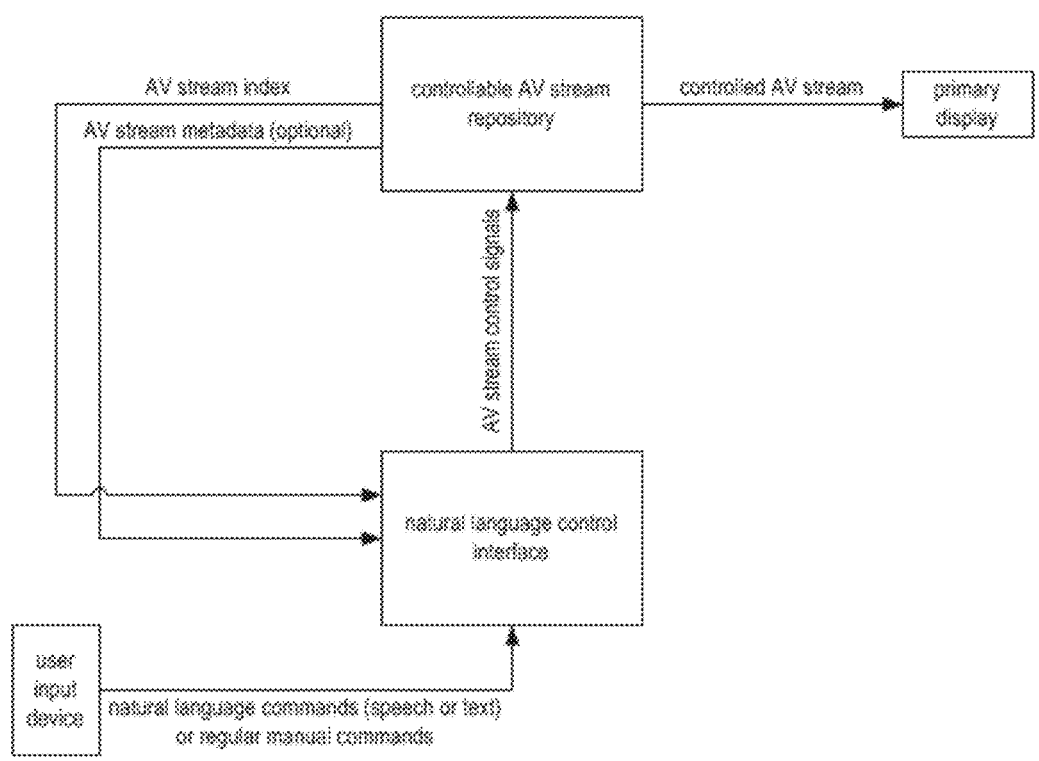
FIG. 3 is a diagram illustrating the complete AV stream operating mode, viewing phase.

In the viewing phase, illustrated in FIG. 3, the AV stream index, and the associated optional AV stream metadata, may be presented to the natural language control interface, to optionally adapt the natural language control interface to the subject AV stream. The user operates the user input device to send a user command to the natural language control interface. The natural language control interface receives the user command, which may be a natural language command, couched in either speech or text; it may also be a regular manual command. The natural language control interface extracts the meaning of the user command and sends suitable AV stream control signals to the controllable AV stream repository to affect playback of the AV stream per the user's bidding, or otherwise affect the controllable AV stream repository. Alternately, the natural language control interface sends the extracted symbolic meaning to the controllable AV stream repository, which processes this meaning to appropriately control the playback of the AV stream, or otherwise affect the controllable AV stream repository.

The following alternate architectures and optional features are noted and are comprehended by the invention.

As noted above, regular manual commands (i.e. based on any of buttons, switches, a touch-sensitive screen or screens, sensors or other physical mechanisms as may be part of the user input device, not involving spoken language or text entry) are also acceptable and may be freely intermixed with natural language commands. In such cases, extracting the meaning of the user command at the natural language control interface involves neither ASR processing or NLU processing, but simply the sending by the natural language control interface of the appropriate AV stream control signal to the controllable AV stream repository.

The AV stream metadata, which as already mentioned is optional, may come from a source other than the true original AV stream source. For instance, the AV stream of a baseball game may come from a television network sports organization, such as Fox Sports, whereas the metadata identifying the contending teams may come from a media services company, such as Tribune Media Services.

Moreover, the AV stream metadata may be augmented or enhanced by access to additional sources or authorities, possibly by embodiments of the invention itself. For instance, continuing the example of the baseball game, by processing nominal AV stream metadata, embodiments of the invention may determine that a particular AV stream constitutes a baseball game, with the San Francisco Giants and the Colorado Rockies as the contending teams. Such embodiments may then directly access the websites of the two teams, or some other authoritative data repository, to obtain for example the player roster of each team, images of the players, the starting lineup of each team, or other data that may be helpful in creating the AV stream index. Such embodiments assume connectivity of the invention to the public Internet or some similar communication network and/or data source; this connection is not depicted in the Figures. This augmenting or enhancement of the AV stream metadata may be performed by the AV stream indexing module, or by some other component of the invention. Alternately, this same information may already be present in the AV stream metadata, as provided to embodiments of the invention.

It is also possible that the AV stream may already have some attached or embedded indexing information; for example, it may be internally marked with the elapsed real time since the start of the stream. In this case, the aforementioned indexing phase may be an optional operation to perform, or may be performed to supplement the already present indexing information. These possibilities are also comprehended by the invention.

In addition, no commitment or limitation is made or implied regarding the physical devices that implement these functions, their geographic proximity, or the nature of the data paths that connect them.

For example, referring to FIG. 2, the AV stream indexing module and controllable AV stream repository may both be realized by and/or located within equipment that is "in the cloud," that is, not on the user's premises. In this configuration, it is further possible that the indexing module and controllable AV stream repository may themselves lie in separate physical locations; indeed it is possible that their services and/or functions may be provided by separate business entities. In another configuration, the AV stream indexing module may be located in the cloud, while the controllable AV stream repository is located on the user's premises. In yet another configuration, both the AV stream indexing module and the controllable AV stream repository may be located on the user's premises. These configurations are exemplary and not limiting.

Likewise referring to FIG. 2, any data path may be implemented, in whole or part, by any of: an RF or optical wireless connection, including but not limited to Bluetooth, WiFi, and cellular data network connections; a wired or wireless data connection, including but not limited to Internet or other connections and including implementations via but not limited to coaxial cable, fiber optic cable, HFC (hybrid fiber coax), twisted pair wiring, and microwave and satellite signaling, and any combination thereof. Particular emphasis is laid on implementations that are asymmetric, heterogeneous or both, and that combine various communication pathway types via gateways, switches, routers, or proxies, for example implementing one data path via a combination of a Bluetooth connection and a wired Internet connection and another data path via a hybrid fiber coax network. These implementations are exemplary and not limiting.

Referring now to FIG. 4, the primary display to which the controlled AV stream connects may be physically close to, or at some distance from, the controllable AV stream repository. Likewise, the connection may be implemented by a point-to-point cable connection, for example a coaxial cable, an S-video cable, a multi-connector audio-video component cable, an HDMI cable, or some other kind of cable; by a multi-node cable television HFC or other communications network; by a wireless connection, for example a Bluetooth, WiFi or cellular data connection; or by some other connection; or by some combination of any number of the foregoing. These implementations are exemplary and not limiting.

Likewise, the user input device may comprise any of a variety of realizations, which may be capable of capturing the user's spoken or textual natural language commands, or accepting the user's regular manual commands, and transmitting these commands to the natural language control interface. For instance, the user input device may be a conventional remote control device, which may be augmented with a microphone apparatus and associated components suitable for the capture of, optional processing of, and transmission of the user's spoken command to the natural language control interface, and which may also be augmented with a mechanical or touch screen keyboard and associated apparatus suitable for the capture of, optional processing of, and transmission of the user's textual command to the natural language control interface; and which may also include any single or multiplicity of buttons, switches, touch sensitive screen or screens, sensors or other physical mechanisms, suitable for capture of, optional processing of, and transmission of the user's manual command to the natural language control interface. Alternately, the user input device may be a wirelessly connected smartphone or tablet, or a conventional desktop or laptop computer, which may be provisioned with a suitable software application, which may have suitable data transmission capabilities and permissions, and which may have been appropriately paired, bonded, registered, or otherwise associated with the natural language control interface, to be capable of capturing the user's spoken or textual natural language commands, or accepting the user's regular manual commands, and transmitting these commands to the natural language control interface. Pertaining to the capability to capture the user spoken commands, the user input device may be operated by a push-to-talk button or a push-to-activate button. Or it may operate in an "always listening mode," wherein the microphone and related apparatus are always capturing audio, and extracting a user's spoken command with or without detection of a prefatory "wake up word." Alternatively, the user input device may be an automatic household assistant, such as the Amazon Echo, Amazon Tap, Google Home, or similar device.

Continuing the discussion of the user input device, the aforesaid microphone apparatus may consist of a single microphone element or a multiplicity of microphone elements. In the latter case the multiplicity of microphone elements may be operated as a beamforming microphone array, or as a primary microphone for capture of user speech and a secondary microphone for capture of ambient noise for electronic cancellation of suppression thereof, or in any other configuration to improve the quality of the speech signal. The microphone apparatus may include an electrical connection for input of and compensation for known environmental noise, as in the audio stream being played back into the audio video stream viewing site. Particular emphasis is laid upon the physical location of the microphone apparatus, which may be within a handled device, within an automatic household assistant, within a consumer electronics component such as a television, set-top box, DVD player or DVR device, a sound bar, or in some other device or location. Notably the microphone elements may be in widely separated physical locations. Moreover the user input device in general may be composed of physically distinct elements, e.g. any of a microphone apparatus, a keyboard apparatus, a handheld device and any other suitable device, each of which may act individually to capture a user command, but which collectively constitute the user input device. These implementations are exemplary and not limiting.

The foregoing comments apply as well to all Figures in this specification that depict the apparatus of the invention, in whole or part.

Live Action AV Stream Operating Mode

In another operating mode, the AV stream in question may arrive live (equivalently, "in real time"), subject only to switching, buffering, and signal propagation delays. This is the "Live Action AV Stream Operating Mode." In this operating mode, the user may issue commands while the sports contest is ongoing. While it is not possible to navigate forward in time into yet-to-be-received portions of the AV stream, the invention allows the user to navigate backward into a contemporaneously created recording of the AV stream (potentially via its associated and likewise contemporaneously created AV stream index). Also, having navigated backward into the AV stream recording, embodiments of the invention support thereafter navigating forward within the recording, up to the current moment (that is, as it exists so far within the controllable AV stream repository).

On the subject of "navigating" forward in time beyond the current moment, that is, into yet-to-be-received portions of the AV stream, see the discussion below of "Live Action AV Stream Operating Mode With Pre-Action (Alert) Support."

Figure 5:
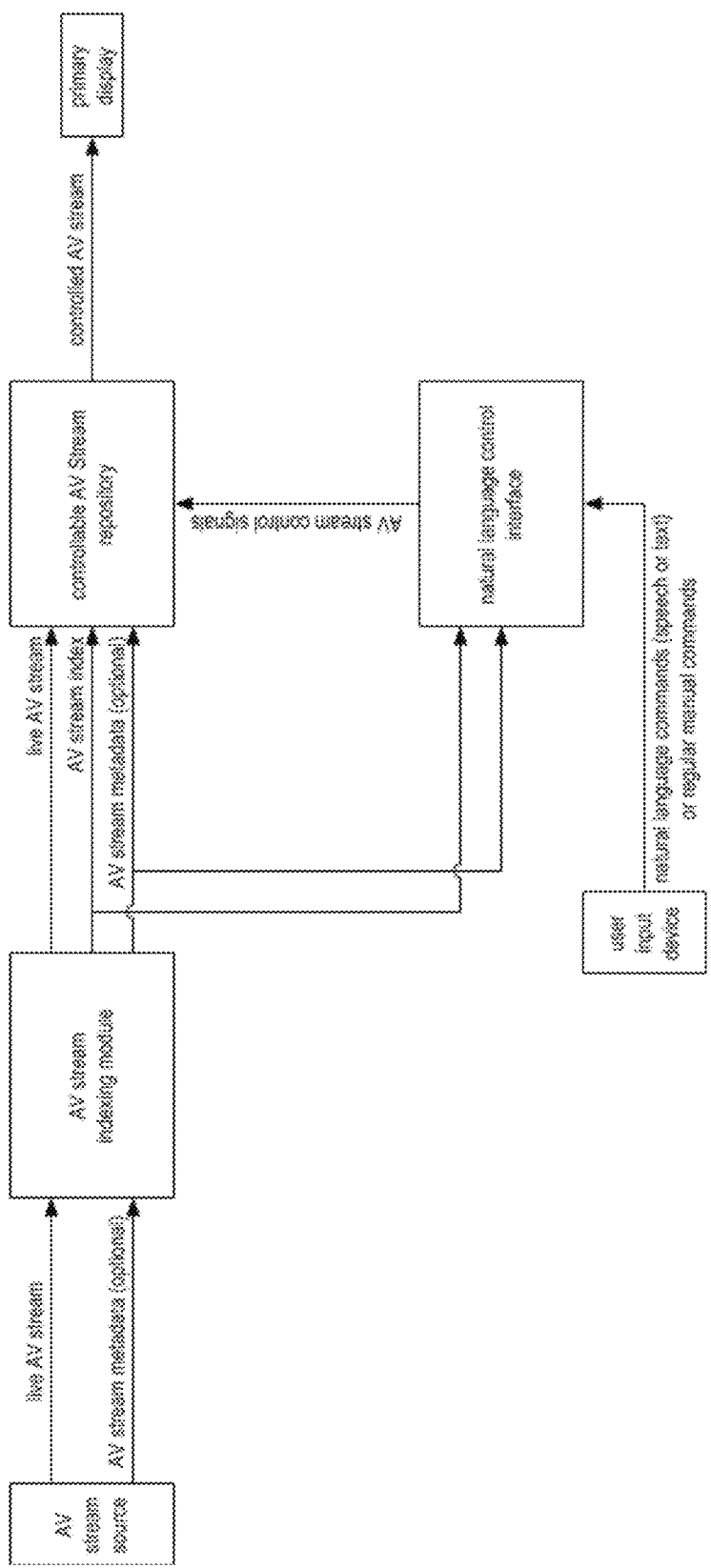
FIG. 5 is a diagram illustrating the live action AV stream operating mode.

In the Live AV Stream Operating Mode, there is no separation into phases. Embodiments of the invention operate as depicted in FIG. 5. An AV stream arrives live, optionally prefaced or accompanied by AV stream metadata. This information is supplied to the AV stream indexing module, which continuously and contemporaneously (or as nearly so as possible) generates the previously described AV stream index. The live AV stream and the synchronized (possibly embedded) AV stream index are deposited into the controllable AV stream repository, optionally along with the AV stream metadata, a process conventionally referred to as "recording." That is, the object or objects deposited in the controllable AV stream repository are continually being enlarged in real time, as new portions of the AV stream and its associated AV stream index arrive (respectively are created). The same AV stream index, and optionally the AV stream metadata, may be supplied to the natural language control interface, which may perform ongoing adaptation to this information.

At the same time, the natural language control interface may receive the user's natural language commands, which may be couched in either speech or text. These commands may cause the playback operation to navigate within the AV stream as it exists so far within the controllable AV stream repository. For instance, embodiments of the invention support the following commands, each with the obvious result.

1. "show me the last down again"
2. "go back and pick up at the start of the second quarter" (appropriate to any time after the start of the second quarter, in sports divided into quarters)
3. "go to the two minute mark in the third quarter"
4. "play the halftime show again"
5. "skip ahead 60 seconds" (appropriate after a command that navigates backward into the AV stream recording; if executing this command would imply navigating forward into yet-to-be-received portions of the AV stream the invention simply resumes display of the live AV stream)

The foregoing list is illustrative only and not exhaustive or limiting.

It is important to note that the receipt, indexing, and recording of the live AV stream and its associated AV stream index are ongoing throughout the processing and execution of any contemporaneous user commands.

It is possible that the AV stream is not in fact live, but is simply treated as such with respect to this operating mode of the invention. That is, the AV stream that serves as an input is actually complete and being played back from an AV stream repository, or is ongoing but is subject to a propagation delay from its original source that is so great that it may no longer be regarded as "live." Nevertheless, it is treated by the invention as if it were live, which is to say, embodiments of the invention simultaneously create or supplement an AV stream index, and also respond to the user's natural language commands to navigate within the AV stream.

Figure 6:
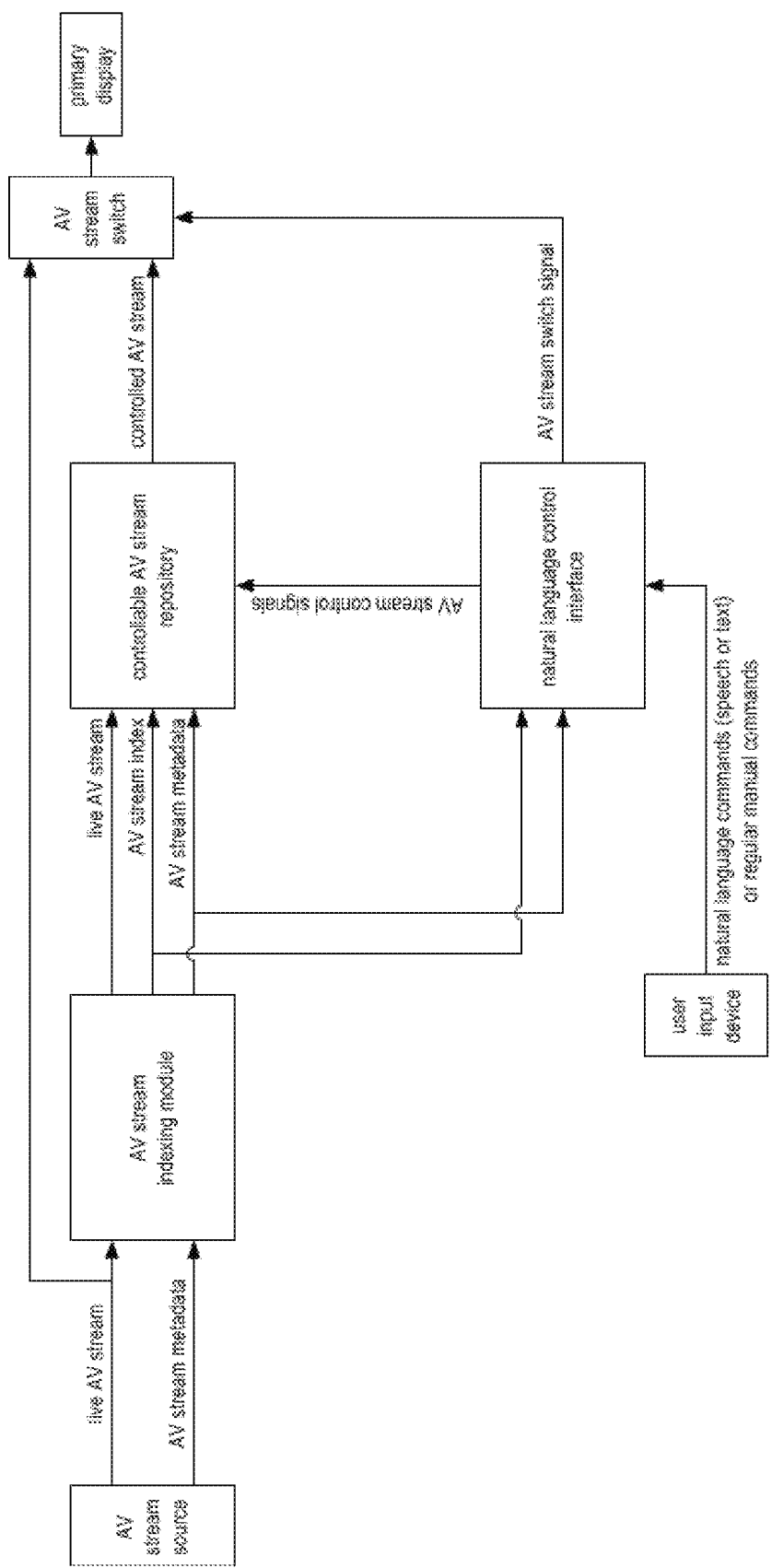
FIG. 6 is a diagram illustrating the live action AV stream operating mode (alternate configuration)

FIG. 6 depicts an alternate configuration for supporting the same functionality, wherein an AV stream switch, controlled by the natural language control interface via the AV stream switch signal, switches between display of the live AV stream supplied to the invention, or the AV stream as played back from the controllable AV stream repository.

Live Action AV Stream Operating Mode with Pre-Action (Alert) Support

As previously noted, it is of course impossible to process commands that nominally require skipping ahead into portions of the AV stream that have not yet been received. However, it is meaningful and useful to receive and process user commands that reference potential or anticipated future events, insofar as they request notification of these events, should they occur, by the invention to the user. We call this functionality "pre-action" or "alert" support and refer to the potential future events as "registered alerts," "alerted events" or just "alerts"; these are identified to the invention by appropriate user commands. Upon the detection of an alerted event, the user is notified. Embodiments of the invention may also respond in other ways, or offer other related functions, as described below.

Figure 7:
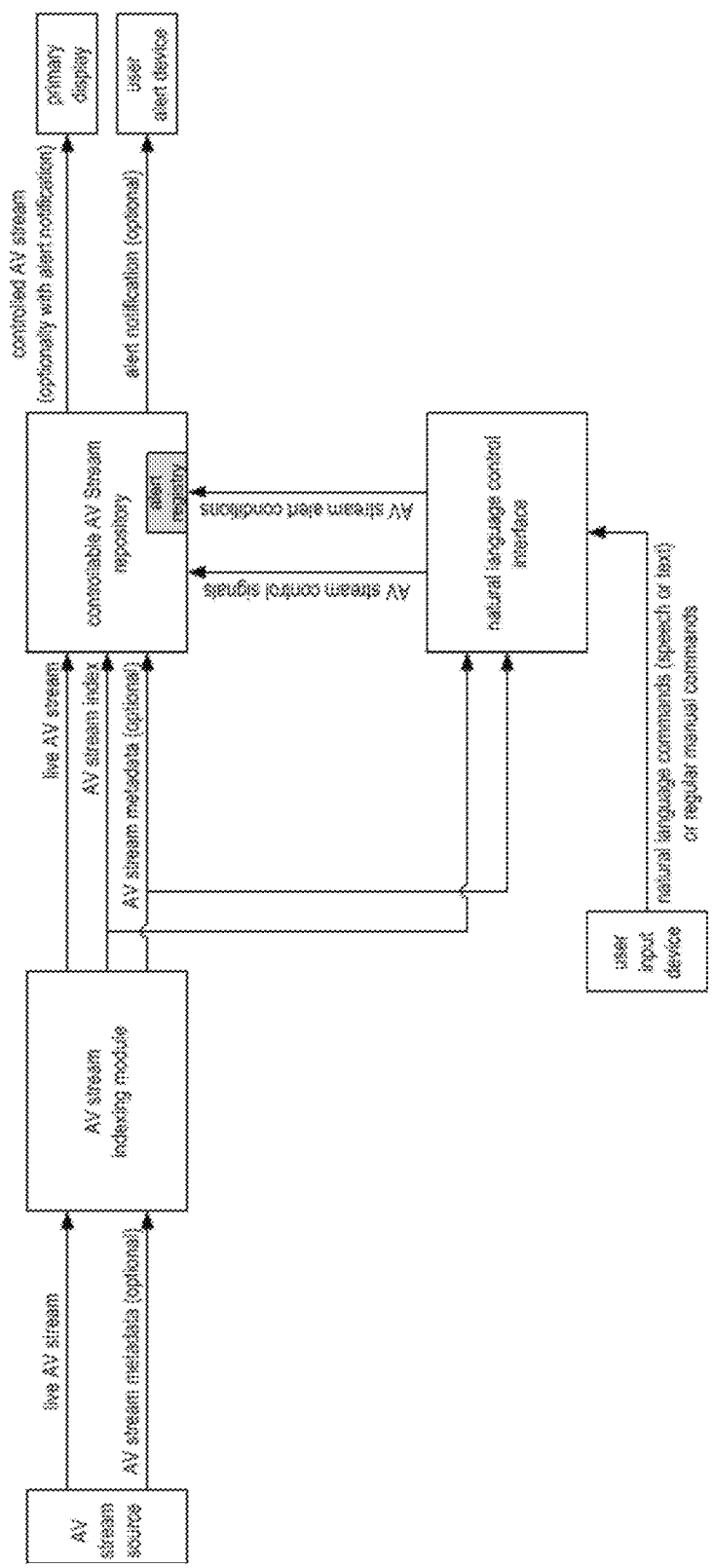
FIG. 7 is a diagram illustrating the live and pre-action AV stream operating mode.

In this operating mode, embodiments of the invention may be architected and may operate as depicted in FIG. 7. In addition to providing alert support, in a manner detailed below, this architecture also supports all of the functions of the Live Action AV Stream Operating Mode described above. The architecture of FIG. 7 differs from those of FIG.

5 and FIG. 6 insofar as the natural language control interface has been augmented to accept and respond to pre-action or alert commands, the controllable AV stream repository has been augmented to accept and monitor for alerts stored in the illustrated "alert registry," and connectivity, internal and/or external, has been optionally augmented to include a means to signal the user alert device upon the detection of an alerted condition.

Specifically, during the ongoing receipt and indexing of the subject AV stream, the user may present spoken or textual natural language commands to the user input device to register alerts. Examples of such commands appear in the earlier Section "Alerts," Subsection "Example Commands to Register an Alert." Upon presentation of such a command, the natural language control interface extracts its meaning, and signals the controllable AV stream repository to register a suitable alert within the illustrated "alert registry." The controllable AV stream repository then monitors the AV stream index, as continuously enlarged by the AV stream indexing module, for an instance of any of the registered alert conditions. Upon detection of any such condition, the controllable AV stream repository signals the user, by one or more of: an audible or visual indication on the primary display, or the sending of a message or notification (e.g. a text message, an email message, a telephone call, or a signal to an application) to a suitably registered or connected user alert device (e.g. a cellphone, a tablet, a connected wristwatch or some other device), if separate from the primary display. Embodiments of the invention may support registration or connection to a multiplicity of user alert devices, with distinct alerts associated with distinct user alert devices, or with any one alert associated with a multiplicity of user alert devices.

Embodiment of the invention support and comprise additional functions and responses related to alerts, which we now describe. To appreciate them it is helpful to consider typical usage scenarios.

One possible scenario for employing the features of this operating mode is that the user may be at some distance from the primary display, that is, the nominal device for viewing the AV stream. Therefore, when an alert occurs the user may be tens of seconds or even several minutes away from being able to view this display. In addition, even if the user has immediate or swift access to the primary display, say by stepping in from an adjoining room, it is possible that the user may wish to see some portion of the action immediately preceding the alerted event, when they resume viewing.

In view of these possibilities, embodiments of the invention support the ability to pause the display of the AV stream automatically upon an alert, while initiating or continuing the ongoing recording of the live incoming AV stream. The user may then when desired, e.g. when they are once again viewing the primary display, or able to give it their full attention, resume viewing the now-delayed AV stream from the moment of pause. This delayed version of the live AV stream is sometimes referred to as a "time-shifted" AV stream.

In a variation of this capability, viewing may resume from some point prior to the alerted event, for instance backing up from the alerted event in the AV stream by some given duration, as determined by an explicit command, such as "resume viewing at 30 seconds before the alert" or "back up 30 seconds and resume viewing", or conversely to some prior related event, for example the start of an offensive drive that led to the actual alerted event, say scoring a touchdown.

Figure 9:
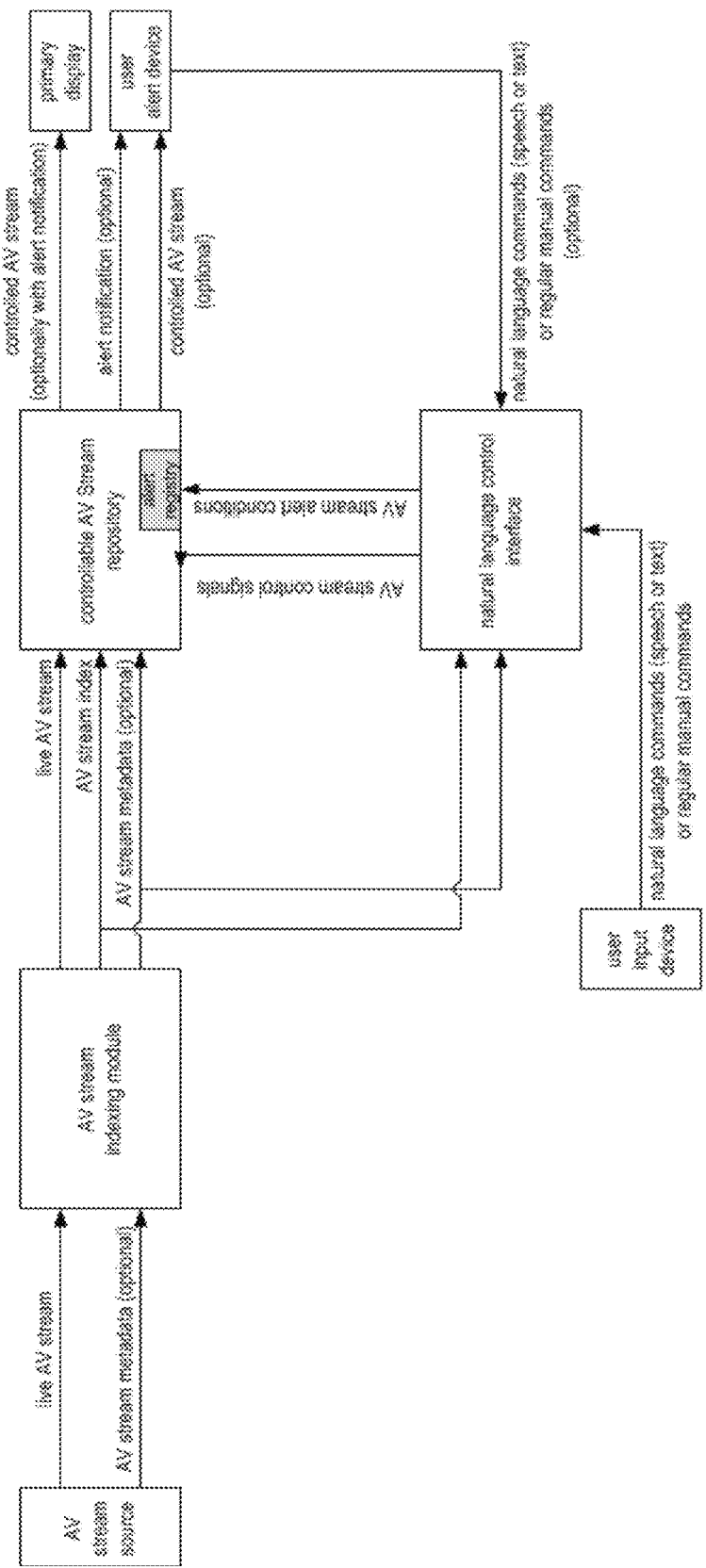
FIG. 9 is a diagram illustrating the live and pre-action AV stream operating mode, with optional pathways for alerted display and control of the AV stream.
Figure 10:
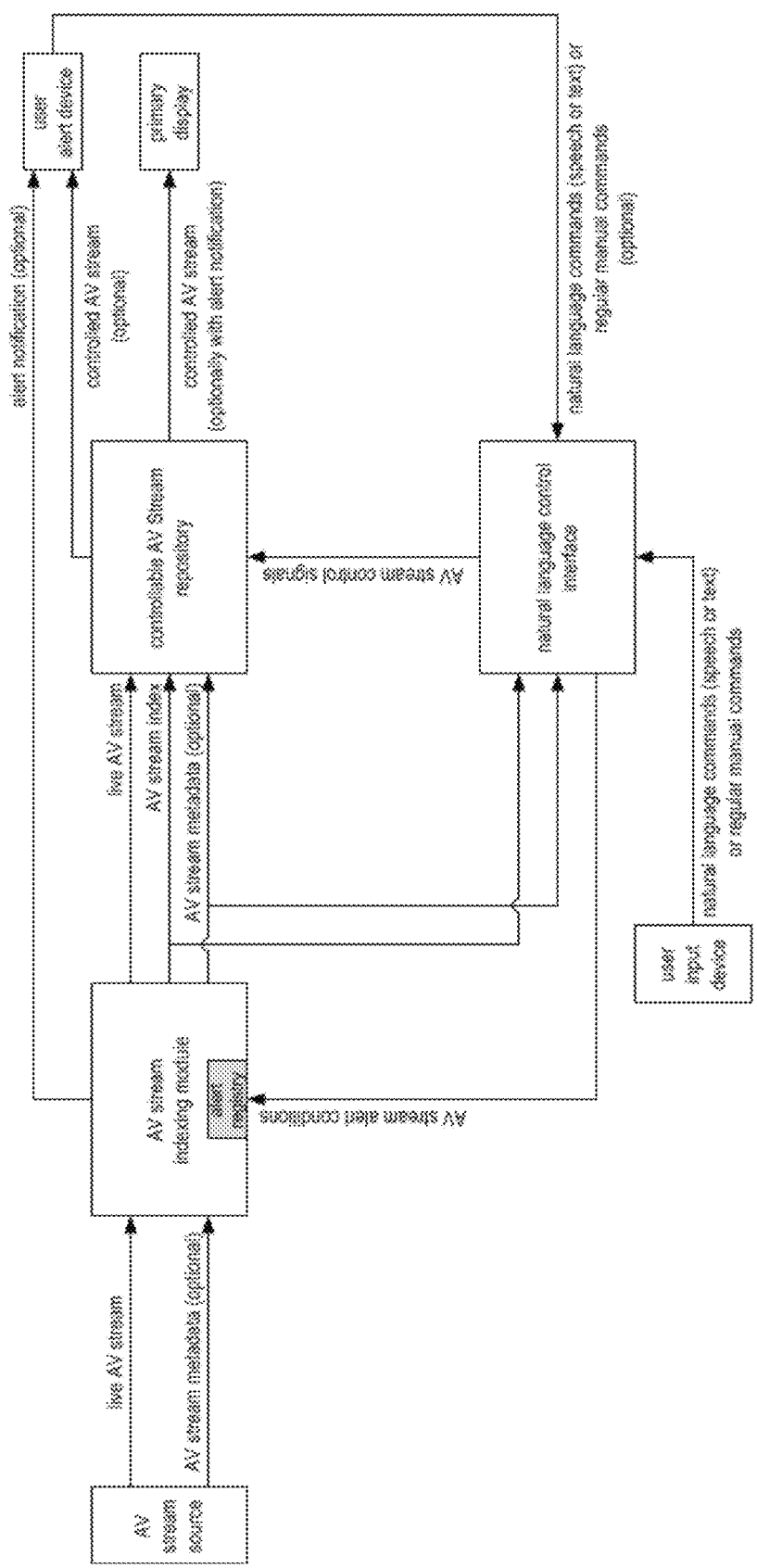
FIG. 10 is a diagram illustrating the live and pre-action AV stream operating mode (alternate configuration), with optional pathways for alerted display and control of the AV stream.

In another variation, illustrated in FIG. 9, and in an alternate configuration in FIG. 10, if the signaled user device has suitable connection and display capabilities, and a suitable communication pathway for transmitting the controlled AV stream exists, upon the occurrence of the alerted event the controlled AV stream may be transmitted to the user alert device, so that the user may immediately pick up on the associated action. The video displayed may be either the live AV stream, or a time-shifted version thereof, as described earlier.

In another variation, if the user alert device has suitable mechanisms and capabilities to function as a user input device as well, and if a suitable communication pathway for transmitting user natural language commands (speech or text) or regular manual commands exists, this AV stream may itself be controlled by natural language commands issued through the user alert device; in such a variation the user alert device operates as well as a user input device.

Multiple alerts may be simultaneously registered and active. Alerts remain registered until the nominal end of the subject AV stream.

As previously noted and discussed, it is possible that the subject AV stream is not in fact live, but is simply treated as such with respect to this operating mode of the invention.

Figure 8:
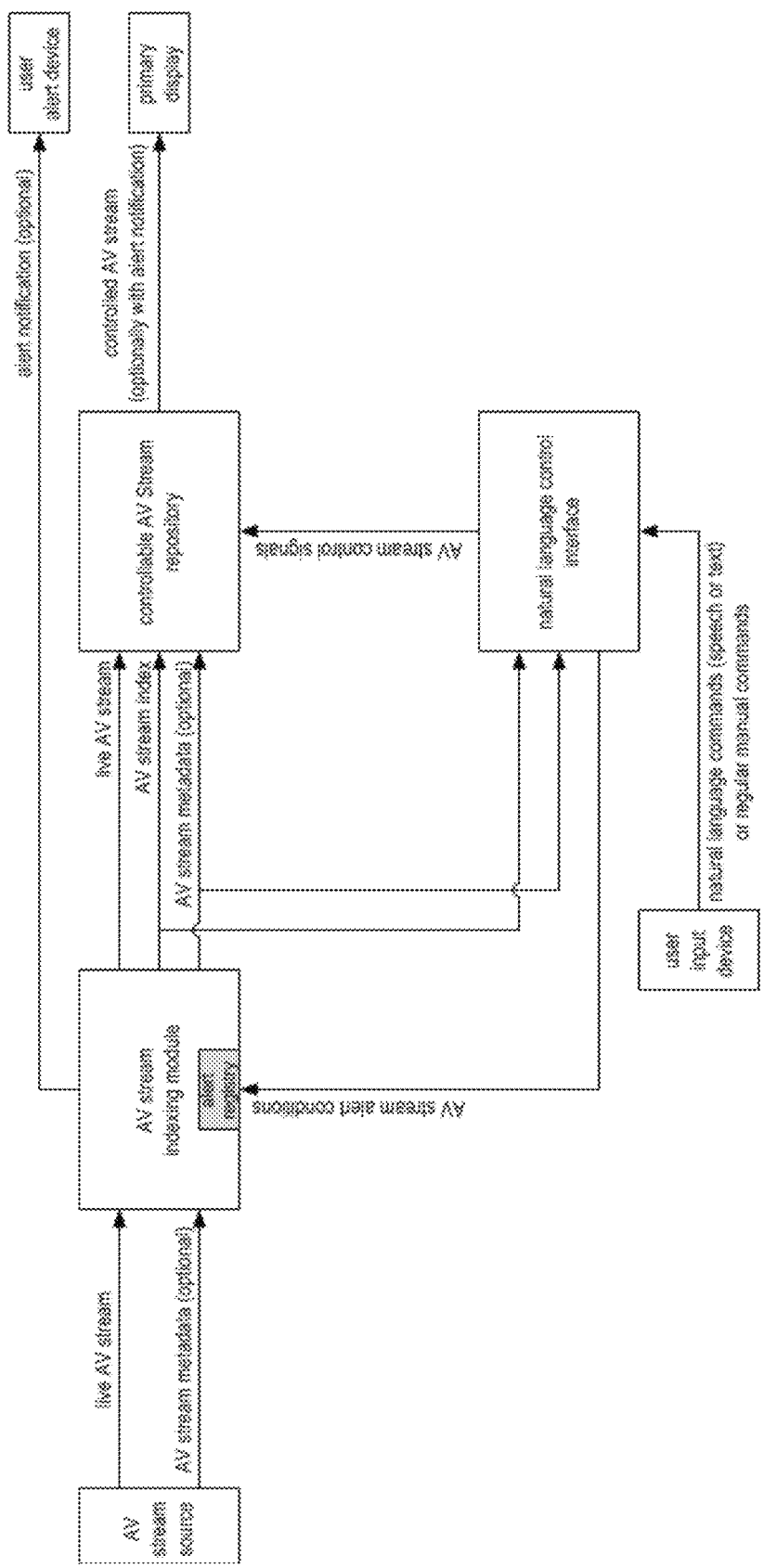
FIG. 8 is a diagram illustrating the live and pre-action AV stream operating mode (alternate configuration)

FIG. 8 depicts an alternate architecture for supporting the same functionality, wherein the alert registry is contained within the AV stream indexing module, and the alert signal is likewise generated from within this module. In addition to the indicated optional "user alert" pathway from the AV stream indexing module to the user alert device, there may be a separate pathway (not depicted in FIG. 8) from the AV stream indexing module to the display, to allow for audible or visual notification of the alert via the display.

Additional Domains

The methods, architectures, interfaces, commands, and functions described herein admit of generalization to additional domains. We sketch some of them now, by identifying the domain and exhibiting some sample commands.

Political Speeches and Debates
1. "skip to where Obama starts talking about Social Security"
2. "alert me when there's a question about immigration"
3. "show me just Hillary's part of the debate"

Talk Shows
1. "tell me when the musical guest starts performing"
2. "jump to where Keira Knightley comes on"
3. "skip over the monologue"

Movies
1. "go to where Gandalf enters"
2. "show me the martial arts scenes"

Concerts
1. "jump to where 'You Belong With Me' starts"
2. "play 'Born to Run' again"

Award Shows
1. "show me just Best Actor, Best Actress, Best Director and Best Picture"
2. "go to the Best Musical award"
3. "go to when De Niro presents"

Breaking News
1. "let me know if the Dow drops by more than 20 points"
2. "alert me if the wildfire jumps over 101"
3. "tell me when the Greek parliament votes on the EU budget proposal"

Computer System

Figure 11:
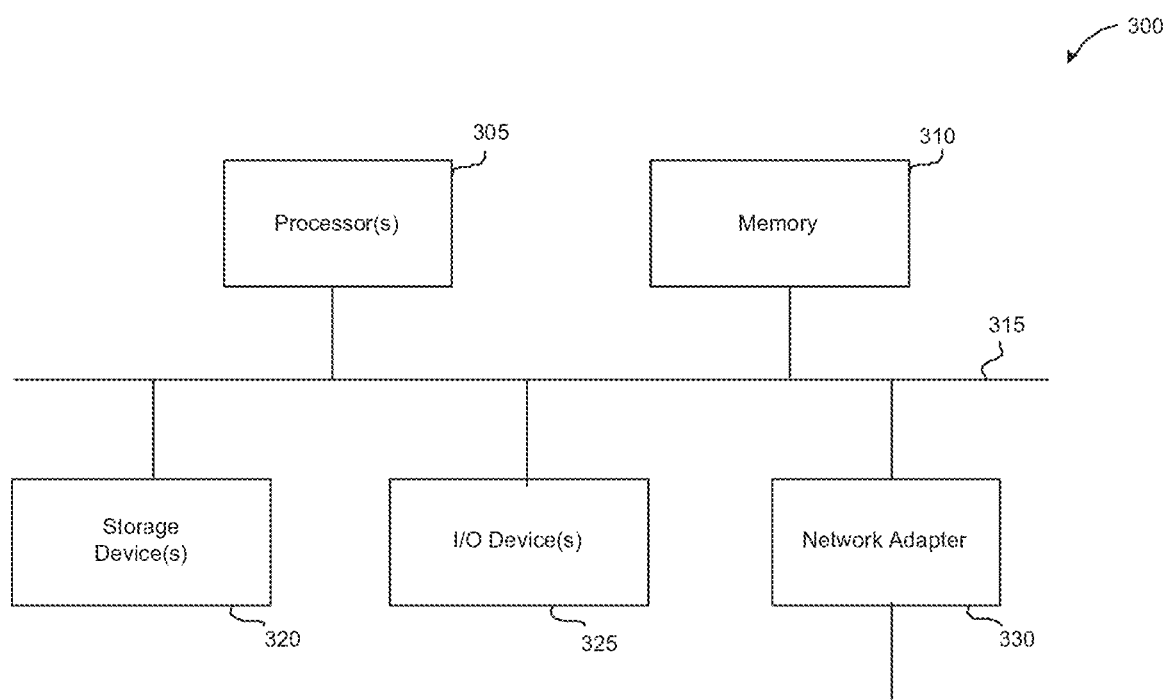
FIG. 11 is a diagram illustrating a machine in the example form of a computer system within which a set of instructions for causing the machine to perform one or more of the methodologies discussed herein may be executed.

FIG. 11 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 300 may include one or more central processing units ("processors") 305, memory 310, input/output devices 325 (e.g. keyboard and pointing devices, touch devices, display devices), storage devices 320 (e.g. disk drives), and network adapters 330 (e.g. network interfaces) that are connected to an interconnect 315. The interconnect 315 is illustrated as an abstraction that represents any one or more separate physical buses, point to point connections, or both connected by appropriate bridges, adapters, or controllers. The interconnect 315, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 310 and storage devices 320 are computer-readable storage media that may store instructions that implement at least portions of the various embodiments. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media (e.g. "non-transitory" media) and computer-readable transmission media.

The instructions stored in memory 310 can be implemented as software and/or firmware to program the processor 305 to carry out actions described above. In some embodiments, such software or firmware may be initially provided to the processing system 300 by downloading it from a remote system through the computing system 300 (e.g. via network adapter 330).

The various embodiments introduced herein can be implemented by, for example, programmable circuitry (e.g. one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method comprising:
obtaining an audio video stream;
receiving an index including a plurality of events or retrieving said index including said plurality of events from a repository;
associating said audio video stream with said plurality of events, said plurality of events including an interpretation of content of said audio video stream;
obtaining a natural language command;
generating a control signal based on said natural language command by referencing a particular event of said plurality of events; and
using said control signal to control presentation of said audio video stream relative to said particular event, thereby suppressing display of one or more portions of said audio video stream, wherein display is initiated at a start or an end of a given portion of said audio video stream that corresponds to said particular event based on a direction of playback.

2. The method of claim 1, wherein said control signal is generated based on said natural language command by referencing two or more events including said particular event of said plurality of events.

3. The method of claim 1, wherein said presentation of said audio video stream comprises at least one of:
presentation of said audio video stream contemporaneously with said obtaining said audio video stream; or
presentation of content of a stored copy of said audio video stream.

4. The method of claim 1, wherein said presentation comprises presentation of at least one of an audio portion of said audio video stream or a video portion of said audio video stream.

5. The method of claim 1, wherein associating said audio video stream with said plurality of events comprises:
determining meaning of said particular event based on particular content of said audio video stream.

6. The method of claim 1 further comprising:
selecting said given portion of said audio video stream for viewing on a display device, said given portion being selected based on said particular event.

7. The method of claim 1, wherein said index includes a symbolic representation of said plurality of events of said audio video stream.

8. The method of claim 1, wherein said index includes a point in time, a duration, or both said point in time and said duration of one or more events of said plurality of events.

9. The method of claim 1, wherein said plurality of events included in said index are generated based on video data of said audio video stream.

10. The method of claim 1, wherein said plurality of events included in said index are generated based on audio data of said audio video stream.

11. The method of claim 1, wherein said plurality of events included in said index are generated based on metadata associated with said audio video stream.

12. The method of claim 1, wherein said plurality of events included in said index are generated based on any combination of video data, audio data, or metadata of said audio video stream.

13. The method of claim 1, wherein generating said control signal based on said natural language command comprises:
processing said natural language command by using an automatic speech recognition system.

14. The method of claim 1, wherein generating said control signal based on said natural language command comprises:
processing said natural language command by using a natural language understanding system.

15. The method of claim 1, wherein generating said control signal based on said natural language command comprises:
processing said natural language command by using both an automatic speech recognition system and a natural language understanding system.

16. The method of claim 1, wherein said natural language command comprises a spoken command.

17. The method of claim 1, wherein said natural language command comprises a textual command.

18. The method of claim 1, wherein obtaining said audio video stream includes at least one of:
obtaining an audio video stream as an ongoing and continuing process; or
obtaining an audio video stream as a completed whole.

19. The method of claim 18, wherein obtaining said audio video stream as said ongoing and continuing process includes at least one of:
obtaining a live audio video stream; or
obtaining content of a stored copy of an audio video stream.

20. The method of claim 1, further comprising:
storing said audio video stream in said repository;
wherein said index of said plurality of events is generated after said audio video stream is stored in said repository.

21. The method of claim 1, wherein said index of said plurality of events is received or retrieved contemporaneously with obtaining said audio video stream.

22. The method of claim 1, wherein said control signal controls presentation of said audio video stream contemporaneously with obtaining said audio video stream.

23. The method of claim 1, wherein obtaining said audio video stream includes receiving a live audio video stream, the method further comprising:
storing said live audio video stream in said repository; and
using said control signal or a different control signal to control at least one of:
presentation of said live audio video stream, or presentation of content of said stored audio video stream relative to said particular event.

24. The method of claim 1, further comprising:
recording said audio video stream to said repository;
wherein said plurality of events are generated contemporaneously with recording said audio video stream to said repository.

25. The method of claim 1 further comprising:
using said natural language command to resume presentation of said audio video stream.

26. The method of claim 1 further comprising:
using said natural language command to commence presentation of said audio video stream.

27. The method of claim 1, wherein using said control signal to control presentation of said audio video stream relative to said particular event comprises:
navigating said audio video stream relative to a change in said content, said change corresponding to said particular event.

28. The method of claim 27, wherein said change in said content includes any of:
a transition in said content from nominal subject matter of said audio video stream to a commercial solicitation,
a transition in said content from a commercial solicitation to nominal subject matter of said audio video stream, or
a transition in said content from a first commercial solicitation to a second commercial solicitation.

29. The method of claim 1, wherein one or more control signals, including said control signal, are generated based on said natural language command by referencing two or more events including said particular event of said plurality of events, said method further comprising:
using said natural language command to play back a plurality of excerpts of said audio video stream.

30. The method of claim 1, wherein using said control signal to control presentation of said audio video stream relative to said particular event comprises:

controlling at least one of a direction of presentation of said audio video stream or a speed of presentation of said audio video stream.

31. The method of claim 1, wherein said content includes a sports contest.

32. The method of claim 1 further comprising, prior to using said control signal to control presentation of said audio video stream:
deducing said particular event based on a notation appearing in said presentation of said audio video stream.

33. The method of claim 1 further comprising, prior to using said control signal to control presentation of said audio video stream:
identifying said particular event relative to an object appearing in said audio video stream.

34. The method of claim 1 further comprising, prior to using said control signal to control presentation of said audio video stream relative to said particular event:
identifying two or more events corresponding to a plurality of discontiguous time segments of said audio video stream.

35. The method of claim 1 further comprising:
using said natural language command to suppress presentation of said particular event.

36. The method of claim 1, said particular event comprising a single contiguous duration of said audio video stream.

37. A computer system comprising:
a processor; and
memory containing at least instructions that, when executed by said processor, cause said computer system to:
obtain an audio video stream;
receive an index including a plurality of events;
associate said audio video stream with said plurality of events, said plurality of events including an interpretation of content of said audio video stream;
obtain a natural language command;
generate a control signal based on said natural language command by referencing a particular event of said plurality of events; and
using said control signal to control presentation of said audio video stream relative to said particular event, thereby suppressing display of one or more portions of said audio video stream,
wherein display is initiated at a start or an end of a given portion of said audio video stream that corresponds to said particular event based on a direction of playback.

38. The computer system of claim 37 comprising:
a server computer including said processor and said memory.

39. The computer system of claim 37 comprising:
a client computer including said processor and said memory.

40. The computer system of claim 37 comprising:
a distributed computer system including a plurality of computers, each said computer including said processor and said memory.

41. The computer system of claim 37, wherein said natural language command is in a spoken format.

42. The computer system of claim 37, wherein said natural language command is in a textual format.

43. A non-transitory machine-readable storage medium storing instructions, execution of which in a computer system causes said computer system to perform operations comprising:
obtaining an audio video stream;
receiving an index including a plurality of events or retrieving said index including said plurality of events from a repository;
associating said audio video stream with said plurality of events, said plurality of events including an interpretation of content of said audio video stream;
obtaining a natural language command;
generating a control signal based on said natural language command by referencing a particular event of said plurality of events; and
using said control signal to control presentation of said audio video stream relative to said particular event, thereby suppressing display of one or more portions of said audio video stream,
wherein display is initiated at a start or an end of a given portion of said audio video stream that corresponds to said particular event based on a direction of playback.

44. A computer system comprising:
a processor; and
memory containing at least instructions that, when executed by said processor, cause said computer system to:
obtain an audio video stream;
retrieve an index from a repository, said index including a plurality of events;
associate said audio video stream with said plurality of events, said plurality of events including an interpretation of content of said audio video stream;
store said audio video stream in said repository to thereby produce a stored audio video stream;
obtain a natural language command;
generate a control signal based on said natural language command by referencing a particular event of said plurality of events; and
use said control signal to control presentation of at least one of said audio video stream or said stored audio video stream, thereby suppressing display of one or more portions of said audio video stream,
wherein display is initiated at a start or an end of a given portion of said audio video stream that corresponds to said particular event based on a direction of playback.

* * * * *